(12) United States Patent
Bartels

(10) Patent No.: US 11,249,497 B2
(45) Date of Patent: Feb. 15, 2022

(54) BALANCED TRIM REGULATOR

(71) Applicant: FISHER CONTROLS INTERNATIONAL LLC, Marshalltown, IA (US)

(72) Inventor: Katherine N. Bartels, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 16/260,714

(22) Filed: Jan. 29, 2019

(65) Prior Publication Data

US 2019/0243394 A1 Aug. 8, 2019

Related U.S. Application Data

(60) Provisional application No. 62/623,931, filed on Jan. 30, 2018.

(51) Int. Cl.
*G05D 16/08* (2006.01)
*G05D 16/02* (2006.01)
*F16K 39/02* (2006.01)
*F16K 47/08* (2006.01)
*F16K 1/36* (2006.01)
(Continued)

(52) U.S. Cl.
CPC .......... *G05D 16/08* (2013.01); *G05D 16/02* (2013.01); *F16K 1/36* (2013.01); *F16K 39/022* (2013.01); *F16K 47/08* (2013.01); *F17C 13/025* (2013.01); *F17C 2250/043* (2013.01); *G05D 16/163* (2013.01)

(58) Field of Classification Search
CPC ...... G05D 16/08; G05D 16/02; G05D 16/163; F17C 13/025; F17C 2250/043; F16K 1/36; F16K 47/08
See application file for complete search history.

(56) References Cited

U.S. PATENT DOCUMENTS 3,813,079 A * 5/1974 Baumann ................ F16K 47/08
251/127
4,834,133 A * 5/1989 LaCoste .................. F16K 3/246
137/315.11
(Continued)

FOREIGN PATENT DOCUMENTS

EP 0167252 A1 1/1986

OTHER PUBLICATIONS

International Search Report and Written Opinion received for PCT/US2019/015057, dated Jun. 14, 2019.

*Primary Examiner* — Matthew W Jellett
*Assistant Examiner* — Christopher D Ballman
(74) *Attorney, Agent, or Firm* — Marshall, Gerstein & Borun LLP

(57) ABSTRACT

A balanced trim pressure regulator includes a valve body having a fluid inlet and a fluid outlet connected by a fluid passageway. An orifice is disposed between the fluid inlet and the fluid outlet. A valve seat is disposed within the fluid passageway. A movable valve plug is disposed within the fluid passageway, the movable valve plug interacting with the valve seat to selectively open or close the fluid passageway. A cage is disposed in the fluid passageway, the cage surrounding the valve plug, and the cage including at least one a balancing passage that fluidly connects the fluid passageway with a balancing chamber.

21 Claims, 3 Drawing Sheets

(51) Int. Cl.
*F17C 13/02* (2006.01)
*G05D 16/16* (2006.01)

(56) References Cited

U.S. PATENT DOCUMENTS

| | | |
|---|---|---|
| 6,283,152 B1 | 9/2001 | Corte, Jr. et al. |
| 7,055,548 B2 | 6/2006 | Hamblin et al. |
| 2004/0099832 A1* | 5/2004 | Gessaman ............ F16K 39/022 251/282 |
| 2016/0186869 A1 | 6/2016 | Hopper et al. |

* cited by examiner

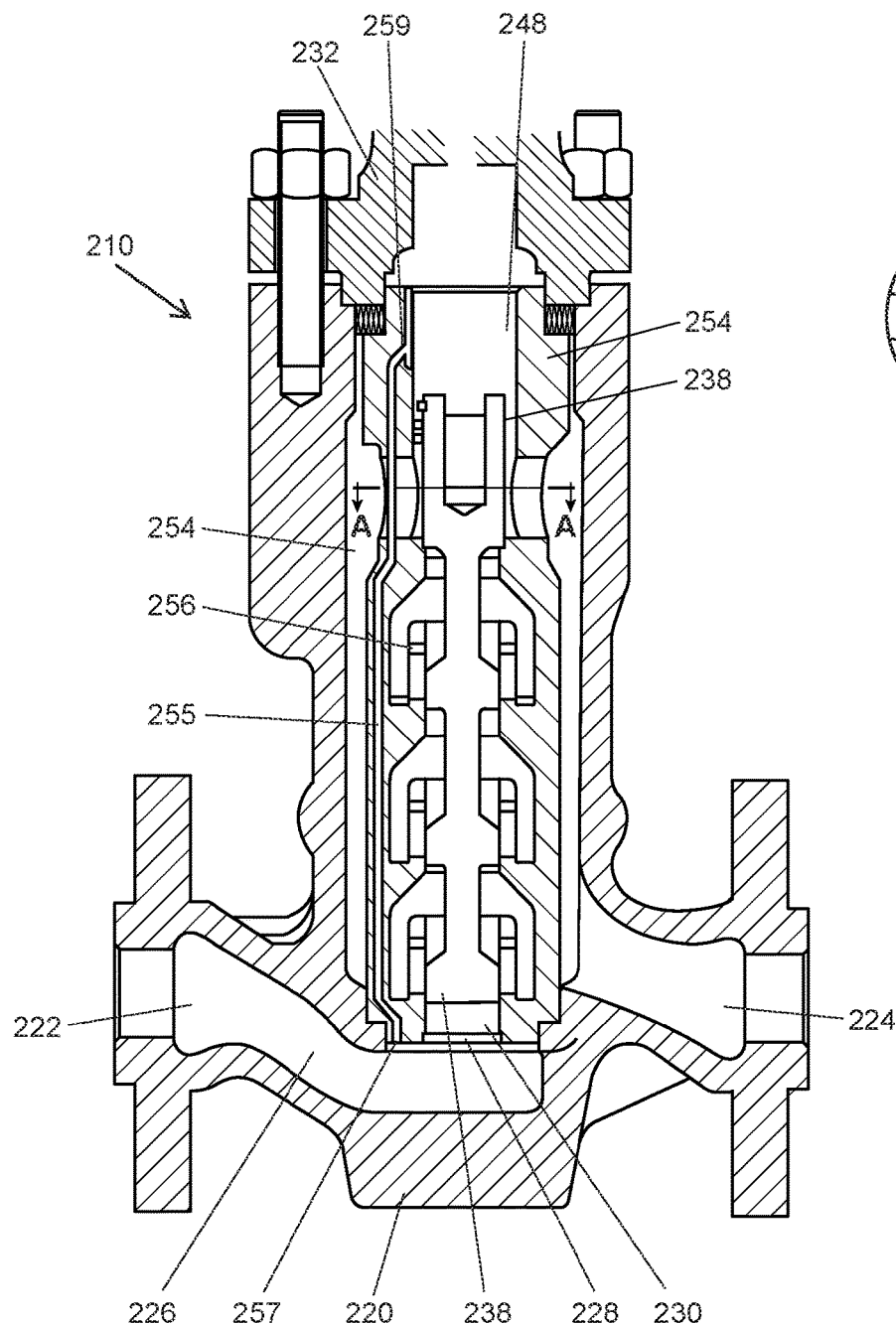
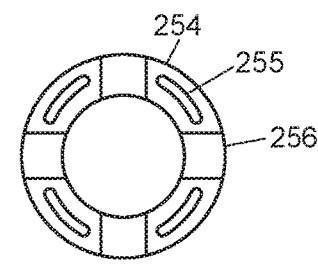
FIG. 4
FIG. 3

BALANCED TRIM REGULATOR

FIELD OF THE DISCLOSURE

The disclosure generally relates to balanced pressure regulators and more specifically to balanced pressure regulators having a balancing passage located in a cage of the valve trim.

BACKGROUND

Pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Pressure regulating valves can be categorized as either balanced or unbalanced. Unbalanced valves typically have high pressure inlet fluid on one side of the valve plug and lower pressure outlet fluid on the other side of the valve plug. Unbalanced valves suffer from an undesirable effect known as decaying inlet characteristic. The decaying inlet characteristic is a phenomenon in which an unbalanced valve experiences an unintended increase in downstream pressure as the upstream pressure decreases. This effect is undesirable as most pressure regulating valves attempt to maintain a constant downstream pressure. Decaying inlet characteristic is caused by fluid forces on the high pressure side of the valve plug attempting to move the valve plug to a closed position. As a result, the valve must have some mechanism to oppose this fluid force on the valve plug. Because the mechanism that opposes the fluid force typically has a set point, the force generated by such a mechanism is constant while the fluid force on the inlet side of the valve plug may vary (e.g., due to a decreasing supply of inlet fluid, or due to pressure variations upstream of the valve). Decaying inlet characteristic is particularly important to applications having a limited compressed fluid source, such as gas cylinders, tube trailers, or hydrils, because in such applications, there is a fixed supply of inlet fluid and thus, the inlet fluid pressure decreases as the inlet fluid supply decreases.

Unbalanced valves also suffer from damage that occurs to the valve seat. In unbalanced valves with high inlet pressures, the fluid pressure acting on large valve orifices can crush the valve seat. As a result, unbalanced valves are not ideal for high pressure, large orifice applications.

To address the decaying inlet characteristic in higher flow applications, balanced pressure regulators were developed. In the balanced pressure regulator, a portion of the upstream pressure is diverted to act on an unexposed portion of the valve plug or an unexposed portion of the valve plug moving mechanism. Thus, the valve plug is "balanced," by not having a net effect of fluid pressure act on the valve plug (or valve plug moving mechanism). In this way, the decaying inlet characteristic is eliminated (or greatly reduced) because the fluid forces acting on valve plug (or on the valve plug moving mechanism) cancel out, resulting in a net zero force attributed to the fluid pressure. In other words, the process fluid itself generates very little, or no opening/closing forces.

In diaphragm-type pressure regulators, higher pressure fluid from an upstream or inlet side of the valve may be vented to a chamber above the valve plug to balance forces on the valve plug, similar to the balanced regulators described above. Typically, this balancing of fluid forces is accomplished by incorporating one or more vent channels or ports that extend through the valve plug from the inlet side to the chamber.

FIG. 1 illustrates a conventional balanced valve 10 with an anti-cavitation trim. The valve 10 includes a fluid inlet 12, a fluid outlet 14, and a fluid inlet passageway 16 which couples the fluid inlet 12 through an orifice 15 to a fluid outlet passageway 18. The valve 10 is of the flow-up variety, in which the fluid inlet 12 and fluid inlet passageway 16 are disposed at a lower level than the fluid outlet 14 and fluid outlet passageway 18. A valve plug 20 is connected via a valve stem 22A to an actuator, which is not shown, but which would be positioned above the valve stem 22A. One or more apertures 22B are provided near the top of the valve plug 20 to receive, for example, a groove pin (not shown) to secure the valve plug 20 to the valve stem 22A. A cage 23 is positioned in the fluid flow path to influence desired characteristics of the fluid flow. An outer surface 24 of the valve plug 20 contacts a surface 26 of a seat ring 28, with the surface 26 of the seat ring 28 forming a valve seat for the valve plug 20.

In an effort to prevent cavitation within the valve 10, it may be desirable to provide an anti-cavitation trim. An anti-cavitation trim may utilize a plurality of symmetrically placed notches 29 to define a staged flow path. The notches 29 are provided to facilitate keeping fluid flowing past the seat ring 28 at a relatively high pressure, and gradually allowing the pressure to decrease as the fluid reaches higher stages.

In operation, the actuator selectively moves the valve stem 22A, and thus moves the valve plug 20, downwardly towards, and upwardly away from, the seat ring 28 in order to respectively close and open the valve 10. Because the position of the valve plug surface 24 with respect to the surface 26 of the seat ring 28 determines the rate at which fluid flows between the valve plug 20 and the seat ring 26, controlling the relative position of the valve plug surface 24 and surface 26 of the seat ring 28 can, to an extent, control the rate at which fluid flows through the valve 10.

However, due to the geometrical shape of the valve plug surface 24 along its area of contact with the surface 26 of the seat ring 28, fluid passing through the orifice 15 from the inlet passageway 16 toward the outlet passageway 18 is not directed away from the seating surfaces 24, 26 of the valve plug 20 and seat ring 28 to a satisfactory extent in order to optimally minimize unbalance forces in the region of the seating surfaces 24, 26.

Also, due to the proximity of the notches 29 to one another, there is a problem of the fluid short-circuiting, i.e. passing from one restriction to the next without making use of the interstage plenum, resulting in the pressure dropping too quickly and thus not sufficiently avoiding cavitation.

In another example, a typical diaphragm-type pressure regulator is illustrated in FIG. 2. The pressure regulator 110 includes a valve body 120 having a fluid inlet 124 and a fluid outlet 122 that are fluidly connected by a passage 126. The passage 126 includes a throat or orifice 128 (forming the narrowest part of the passage 126) in which a valve seat 130 is disposed. A bonnet 132 houses a load spring 134 that is connected to a valve stem 136. The valve stem 136 is operatively attached to a valve plug 138. The valve plug 138 interacts with the valve seat 130 to control fluid flow through the valve body 120 from the inlet 124 to the outlet 122.

A diaphragm 139 is connected to the bonnet 132 and to the valve plug 138. The diaphragm 139 separates the passage 126 from a cavity 140 in the bonnet 132 that contains the load spring 134. The diaphragm 139 is responsive to pressure differences between the passage 126 and the cavity 140.

A retainer 142 is attached to the valve stem 136 and forms part of the valve plug 138 and retains the valve plug 138 on the valve stem 136. The retainer 142 may include one or more fasteners 144, such as a nut, which are attached to the valve stem 136. One or more balancing passages or channels 146 fluidly connect the passage 126 with a chamber 148 located between the valve plug 138 and the cavity 140. Fluid forces on the valve plug 138 are balanced by fluid moving through the balancing channels 146.

One problem with diaphragm-type balanced regulators, such as the balanced regulator illustrated in FIGS. 1 and 2 is that they suffer from droop, or a decrease in setpoint with increased flow.

SUMMARY

In accordance an exemplary aspect, a balanced trim pressure regulator includes a valve body having a fluid inlet and a fluid outlet connected by a fluid passageway. An orifice is disposed between the fluid inlet and the fluid outlet. A valve seat is disposed within the fluid passageway. A movable valve plug is disposed within the fluid passageway, the movable valve plug interacting with the valve seat to selectively open or close the fluid passageway. A cage is disposed in the fluid passageway, the cage surrounding the valve plug, and the cage includes at least one balancing passage that fluidly connects the fluid passageway with a balancing chamber In accordance with another exemplary aspect, a balanced trim assembly includes a valve seat disposed within a fluid passageway. A movable valve plug is disposed within the fluid passageway, the movable valve plug interacting with the valve seat to selectively open or close the fluid passageway. A cage is disposed in the fluid passageway, the cage surrounding the valve plug, and the cage including at least one balancing passage that fluidly connects the fluid passageway with a balancing chamber.

The foregoing aspects may be combined with any one or more of the following preferred forms as well with other aspects and/or additional aspects, arrangements, features, and/or technical effects that are apparent upon detailed inspection of the Figures and the following description.

In one preferred form, the cage includes a first opening and a second opening, the first opening and the second being connected by the balancing passage.

In another preferred form, the first opening includes a chamfered surface.

In yet another preferred form, the cage includes a plurality of balance passages distributed circumferentially about the cage.

In yet another preferred form, the cage is formed by additive manufacturing techniques.

In yet another preferred form, the valve plug has a diameter that is too small to accommodate a balance passage.

In yet another preferred form, the balance passage is located outside of a diameter of a plug seal.

BRIEF DESCRIPTION OF THE DRAWINGS

FIG. 3 is a cross-sectional view of a balanced trim regulator constructed in accordance with the teachings of the disclosure; and FIG. 4 is a cross-sectional view of a cage of the balanced trim regulator of FIG. 3, taken along line A-A in FIG. 3.

Figure 1:
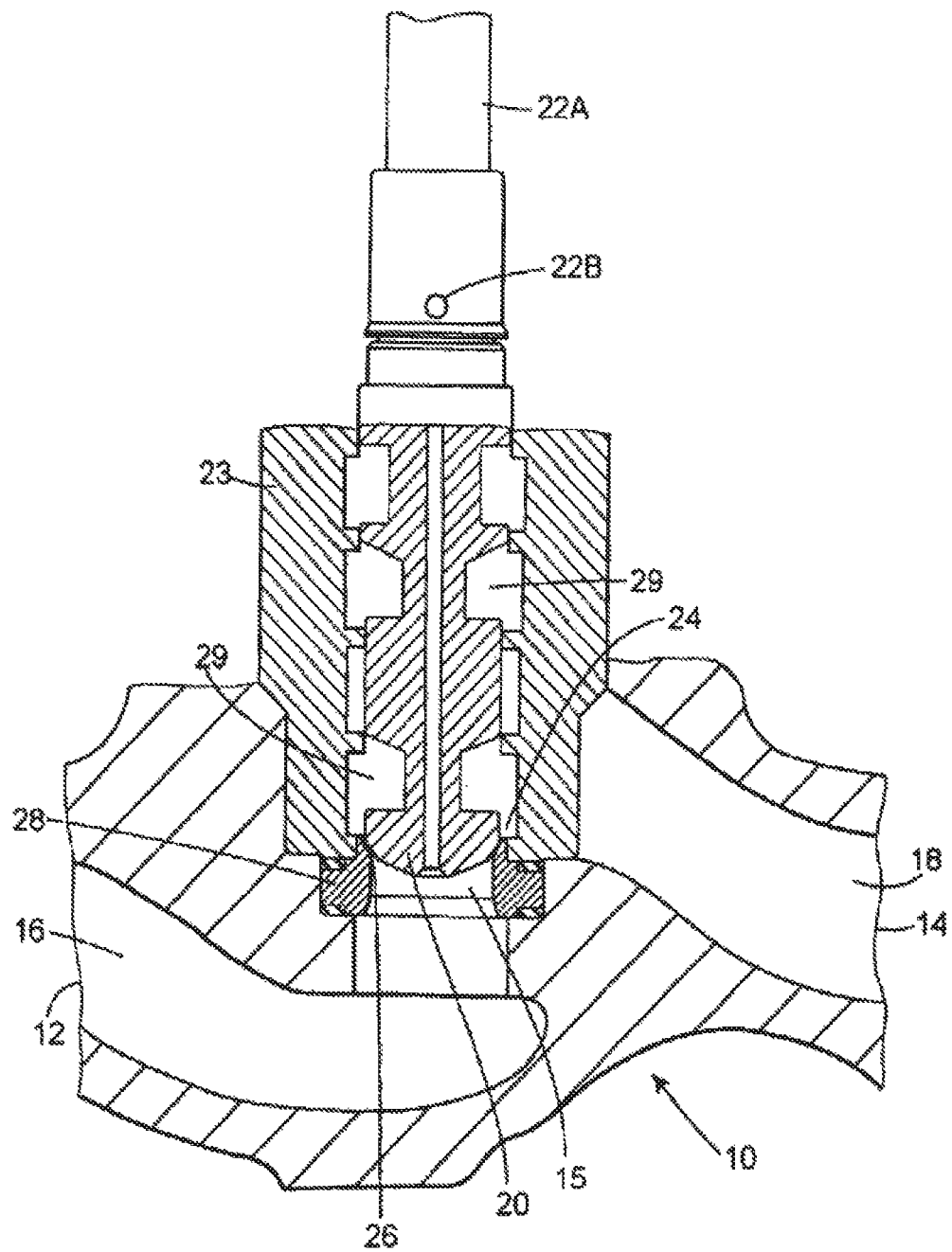
FIG. 1 is a cross-sectional view of a prior art balanced regulator.
Figure 2:
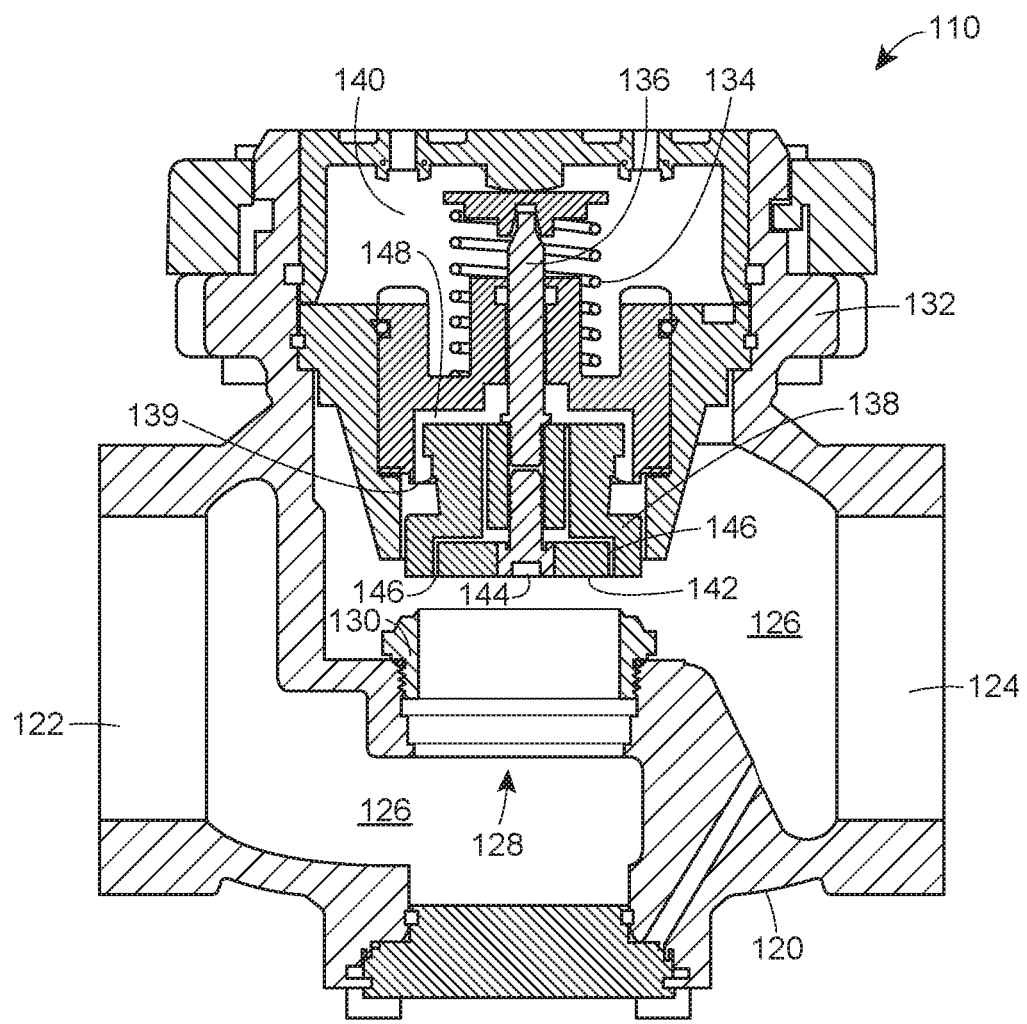
FIG. 2 is a cross-sectional view of another prior art balanced regulator.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION

Referring now to the drawings and with specific reference to FIGS. 3 and 4, a balanced port pressure regulator is generally referred to by reference numeral 210. The balanced port pressure regulator 210 includes a valve body 220 having a fluid inlet 222 and a fluid outlet 224 connected by a fluid passageway 226. The fluid passageway 226 includes a throat or orifice 228 (i.e., the narrowest part of the passageway 226) leading from the fluid inlet 222 to the fluid outlet 224, and a valve seat 230 disposed in the orifice 228. In the embodiment of FIG. 3, the valve seat 230 forms the orifice 228, which is the narrowest part of the fluid passageway 226 in the valve body 220.

A bonnet 232 houses a load spring (not shown) that is connected to a valve stem (not shown). The valve stem is operatively attached to a valve plug 238. The valve plug 238 interacts with the valve seat 230 to control fluid flow through the valve body 220 from the inlet 222 to the outlet 224. In the embodiment of FIG. 3, the valve plug 238 is located downstream of the valve seat 230. In other embodiments, the valve plug 238 may be located upstream of the valve seat 230.

A cage 254 surrounds the valve plug 238. In the embodiment of FIG. 3, the cage 254 is integrally formed with the valve seat 230. In other embodiments, the cage 254 and the valve seat 230 may be formed as separate components. The cage 254 characterizes fluid flow through the valve body 220. More specifically, the cage 254 may include a plurality of flow passages or openings 256. A plurality of balancing channels 255 are formed in a side wall of the cage 254, through which process fluid is allowed to flow to a balancing chamber 248. The cage 254 has a first opening 257 that terminates in the orifice 228 and a second opening 259 that terminates in the balancing chamber 248. In the embodiment illustrated in FIG. 3, the first opening 257 may alternatively be an open end or a plurality of balancing channels 255 that are circumferentially disposed about the cage 254, as illustrated in FIG. 4.

Fluid forces on the valve plug 238 are balanced by fluid moving through the balancing channels 255 from higher pressure regions to lower pressure regions.

The balancing channels 255 fluidly connect the passageway 226 in the orifice 228 to the balancing chamber 248.

In some embodiments, the valve seat 230, the valve stem, the valve plug 238, and the cage 154 may be formed as a balanced plug assembly.

In other embodiments, the first open end 257 may include a chamfered opening surface, or a surface that otherwise directs the opening away from the direction of fluid flow from the inlet 222, as illustrated in FIG. 3. In yet other embodiments, a plurality of openings 257 may be distributed circumferentially around the cage 254, as illustrated in FIG. 4. The balancing channels 255 may be generally oval in cross-sectional shape. In other embodiments, the balancing channels 255 may take on virtually any other cross-sectional shape, such as circle, square, triangle, slot, irregular, or any other shape. Particular shapes may be selected to aid in directing local fluid flow into the balancing channels 255 at different locations within the cage 254. In yet other embodiments, the cage 254 may include a combination of openings, chamfered openings, and circumferentially disposed openings.

When the valve plug 238 is in a closed position, contacting the valve seat 230, the first end 257 is generally located between the upstream most portion of the orifice 228 and the valve plug 238. By thus locating the first end 257, the first end 257 avoids the initial area of highest flow velocity between the valve plug 238 and the valve seat 230 when the valve plug 238 initially begins to open.

This highest flow velocity area is sometimes referred to as the "curtain area." Because the average flow velocity in the curtain area is the highest, static pressure in this region is lowest in the passageway 226. The curtain area remains the area of highest flow velocity until the valve plug 238 opens sufficiently to make the curtain area larger than the orifice area. At this point, the orifice itself becomes the primary flow restriction and the flow velocity in the orifice becomes the highest flow velocity in the passageway 226. Because the first end 257 is located within the orifice 228, but not in the curtain area, the pressure transmitted through the cage 254 to the balance chamber 248 is also reduced, resulting in a substantial boost to the valve as the valve plug 238 approaches a fully open position, which is where prior art valves experience droop. This boost near the fully open position counteracts the droop, resulting in more constant outlet pressures as the valve plug 238 approaches the fully open position.

Any of the embodiments of balanced trim regulators or balanced plug assemblies disclosed herein may be used to advantageously combat regulator pressure droop at a point in the opening cycle where boost is needed most, near the fully open position of the valve plug because the orifice does not become the most restrictive point in the flow passageway until the valve plug nears a fully open position.

Additionally, the balanced trim regulators disclosed herein advantageously allow balanced regulators to be formed in regulators with small port sizes where the valve plug, or plug post, is too small to accommodate a balance passageway. The cages described herein may be formed by additive manufacturing techniques. The balance passageways may be integrally formed in the cage. Additionally, the balance passages in the cage described herein advantageously pass outside of the diameter of the plug seal.

In other embodiments, the balance passageways could be formed in trim elements other than the cage or valve plug.

In yet other embodiments, the cage could be formed in multiple pieces, the balance passageways extending though the multiple pieces. In yet other embodiments, the balance passages may include a lattice structure.

Although certain balanced trim regulators and balanced trim assemblies have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

What is claimed is:

1. A balanced trim pressure regulator, comprising:
    a valve body having a fluid inlet and a fluid outlet connected by a fluid passageway, and an orifice being disposed between the fluid inlet and the fluid outlet;
    a valve seat disposed within the orifice of the fluid passageway;
    a valve plug, the valve plug being movably disposed within the fluid passageway, the valve plug interacting with the valve seat to selectively open or close the fluid passageway;
    a balancing chamber above the valve plug; and
    a cage disposed in the fluid passageway, the cage surrounding the valve plug, the cage including a plurality of balancing passages that fluidly connect the fluid passageway with the balancing chamber,
    wherein the plurality of balancing passages are distributed circumferentially about the cage, wherein the plurality of balancing passages are entirely separate from one another, and wherein the cage includes a first longitudinal end and a second longitudinal end opposite the first longitudinal end, the first longitudinal end and the second longitudinal end being connected by each of the plurality of balancing passages when the valve plug is in a closed position in which the valve plug contacts the valve seat to close the fluid passageway, and
    wherein each balancing passage of the plurality of balancing passages has a first end and a second end that is opposite the first end, and wherein the first end of each balancing passage is located in the first longitudinal end of the cage and the second end of each balancing passage terminates in the balancing chamber and is located proximate the second longitudinal end of the cage.

2. The balanced trim pressure regulator of claim 1, wherein the first longitudinal end includes a chamfered surface.

3. The balanced trim pressure regulator of claim 1, wherein the valve plug has a diameter that is too small to accommodate a balancing passage.

4. The balanced trim pressure regulator of claim 1, wherein the plurality of balancing passages are located outside of a diameter of a plug seal.

5. The balanced trim pressure regulator of claim 1, wherein the valve plug is movably disposed within the fluid passageway along a longitudinal axis, the plurality of balancing passages are distributed circumferentially about the longitudinal axis, and each balancing passage of the plurality of balancing passages extends in a direction that is parallel to the longitudinal axis.

6. The balanced trim pressure regulator of claim 5, wherein each balancing passage of the plurality of balancing passages extends substantially entirely in the direction that is parallel to the longitudinal axis.

7. The balanced trim pressure regulator of claim 1, wherein the cage is a monolithic cage.

8. The balanced trim pressure regulator of claim 1, wherein the first longitudinal end of the cage is located within the orifice of the fluid passageway.

9. The balanced trim pressure regulator of claim 1, wherein the valve seat is located immediately adjacent the first longitudinal end of the cage.

10. The balanced trim pressure regulator of claim 1, wherein the valve plug slidably engages one or more portions of an inner surface of the cage, and wherein the balancing chamber is defined by and located entirely radially inward of the inner surface of the cage.

11. The balanced trim pressure regulator of claim 1, wherein the first longitudinal end of the cage engages the valve body or the valve seat.

12. A balanced trim assembly configured to be disposed in a valve body, the balanced trim assembly comprising:
 a valve seat;
 a valve plug, the valve plug being movable relative to the valve seat, the valve plug interacting with the valve seat to selectively open or close the valve seat;
 a balancing chamber above the valve plug; and
 a cage adapted to be disposed in a fluid passageway of the valve body, the cage surrounding the valve plug, the cage including a plurality of balancing passages that fluidly connect the fluid passageway with the balancing chamber,
 wherein the plurality of balancing passages are distributed circumferentially about the cage, wherein the plurality of balance passages are entirely separate from one another, and wherein the cage includes a first longitudinal end and a second longitudinal end opposite the first longitudinal end, the first longitudinal end and the second longitudinal end being connected by each of the plurality of balancing passages when the valve plug is in a closed position in which the valve plug contacts the valve seat to close the valve seat, and
 wherein each balancing passage of the plurality of balancing passages has a first end and a second end that is opposite the first end, and wherein the first end of each balancing passage is located in the first longitudinal end of the cage and the second end of each balancing passage terminates in the balancing chamber and is located proximate the second longitudinal end of the cage.

13. The balanced trim assembly of claim 12, wherein first longitudinal end includes a chamfered surface.

14. The balanced trim assembly of claim 12, wherein the valve plug has a diameter that is too small to accommodate a balancing passage.

15. The balanced trim assembly of claim 12, wherein the plurality of balancing passages are located outside of a diameter of a plug seal.

16. The balanced trim assembly of claim 12, wherein the valve plug is movable relative to the valve seat along a longitudinal axis, the plurality of balancing passages are distributed circumferentially about the longitudinal axis, and each balancing passage of the plurality of balancing passages extends in a direction that is parallel to the longitudinal axis.

17. The balanced trim assembly of claim 12, wherein the cage is a monolithic cage.

18. A balanced trim pressure regulator, comprising:
 a valve body having a fluid inlet and a fluid outlet connected by a fluid passageway, and an orifice being disposed between the fluid inlet and the fluid outlet, the orifice being the most narrow portion of the fluid passageway;
 a valve seat disposed within the orifice of the fluid passageway;
 a valve plug, the valve plug being movably disposed within the fluid passageway, the valve plug interacting with the valve seat to selectively open or close the fluid passageway;
 a balancing chamber; and
 a cage disposed in the fluid passageway, the cage surrounding the valve plug, the cage including at least one balancing passage that fluidly connects the fluid passageway with the balancing chamber,
 wherein each balancing passage of the at least one balancing passage has a first end and a second end that is opposite the first end, wherein the first end of each balancing passage is located in a first longitudinal end of the cage and the second end of each balancing passage is located proximate a second longitudinal end of the cage opposite the first longitudinal end of the cage, wherein the first end of each balancing passage is located within the orifice of the fluid passageway, wherein the second end of each balancing passage terminates in the balancing chamber, wherein the valve plug slidably engages one or more portions of an inner surface of the cage, wherein the balancing chamber is defined by and located entirely radially inward of the inner surface of the cage, and wherein the first longitudinal end of the cage engages the valve body or the valve seat.

19. The balanced trim pressure regulator of claim 18, wherein the at least one balancing passage comprises a plurality of balancing passages distributed circumferentially about the cage.

20. The balanced trim pressure regulator of claim 18, wherein the at least one balancing passage comprises a plurality of balancing passages that are entirely separate from one another.

21. The balanced trim pressure regulator of claim 18, wherein the valve seat is located immediately adjacent the first longitudinal end of the cage.

* * * * *

UNITED STATES PATENT AND TRADEMARK OFFICE
CERTIFICATE OF CORRECTION

| | | |
|---|---|---|
| PATENT NO. | : 11,249,497 B2 | Page 1 of 1 |
| APPLICATION NO. | : 16/260714 | |
| DATED | : February 15, 2022 | |
| INVENTOR(S) | : Katherine N. Bartels | |

It is certified that error appears in the above-identified patent and that said Letters Patent is hereby corrected as shown below:

On the Title Page

At item (57), Line 10, "one a" should be -- one --.

In the Specification

At Column 2, Line 49, "seat ring 26," should be -- seat ring 28, --.

At Column 3, Line 32, "an" should be -- with an --.

At Column 3, Line 43, "chamber" should be -- chamber. --.

At Column 5, Line 27, "upstream most portion" should be -- upstream portion --.

At Column 6, Line 2, "though" should be -- through --.

Signed and Sealed this
Twenty-eighth Day of February, 2023

Katherine Kelly Vidal
*Director of the United States Patent and Trademark Office*